United States Patent [19]

Boling

[11] 4,322,186
[45] Mar. 30, 1982

[54] TORQUE TRIGGERING CLUTCH

[76] Inventor: Monte J. Boling, 2 Crestwood Ave., Fairfield, N.J. 07006

[21] Appl. No.: 149,544

[22] Filed: May 13, 1980

Related U.S. Application Data

[63] Continuation of Ser. No. 880,101, Feb. 22, 1978, abandoned, which is a continuation-in-part of Ser. No. 732,511, Oct. 14, 1976, abandoned.

[51] Int. Cl.³ .................. B23B 47/24; B23B 31/38
[52] U.S. Cl. .................. 408/139; 192/56 R; 279/1 ME; 408/73
[58] Field of Search .............. 408/139, 140, 73; 74/148; 279/1 R, 1 ME; 192/56 R; 64/30 R, 30 C

[56] References Cited

U.S. PATENT DOCUMENTS

| | | | |
|---|---|---|---|
| 1,353,048 | 9/1920 | Koontz | 408/73 |
| 1,872,059 | 8/1932 | Breitenstein | 408/73 |
| 2,028,075 | 1/1936 | Nell | 408/73 |
| 2,463,083 | 3/1949 | Brownlee | 279/1 ME |
| 2,741,352 | 4/1956 | Stevens et al. | 192/56 R |
| 3,002,206 | 10/1961 | Johnson | 192/56 R |
| 3,214,773 | 11/1965 | Benjamin | 408/140 |
| 3,787,136 | 1/1974 | Steiner | 408/139 |
| 3,791,756 | 2/1974 | Johnson | 408/139 |
| 3,999,642 | 12/1976 | Johnson | 408/139 X |
| 4,122,928 | 10/1978 | Smith | 192/56 R |

FOREIGN PATENT DOCUMENTS 825133 12/1959 United Kingdom ............ 192/56 R Primary Examiner—William R. Briggs

[57] ABSTRACT

A torque triggering clutch for automatically releasing the jaws of a tightening chuck or other gripping fixture used on high speed capping machinery which screw on tops or caps of filed containers. The torque triggering clutch releases the jaws of the chuck or gripping fixture when a pre-set torque on the top or cap has been attained. The device comprises a threaded and rotatable cap for applying greater or lesser pressure on a friction clutch assembly through an intermediate pin and coil spring assembly; a plunger and trigger head assembly which moves up or down against the pressure of a second coil spring and associated with the tightening chuck for opening same when the pre-set torque has been attained; and, two steel balls, magnets and slots which function to alternately restrain and then allow the trigger head to move upwardly thereby releasing the tightening chuck or gripping fixture.

16 Claims, 7 Drawing Figures

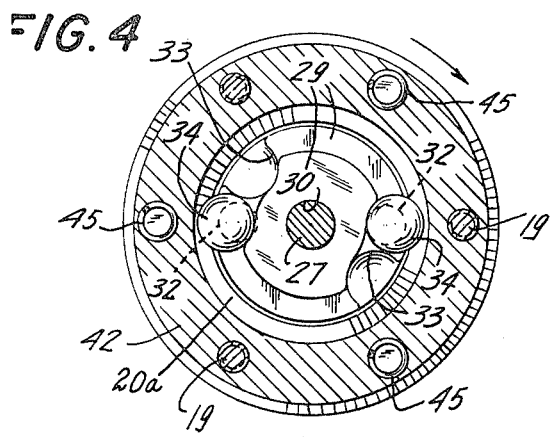
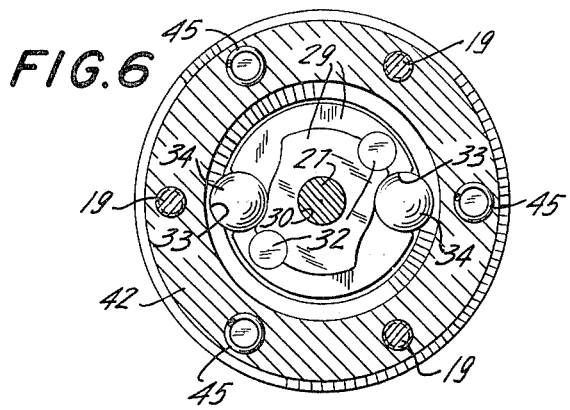
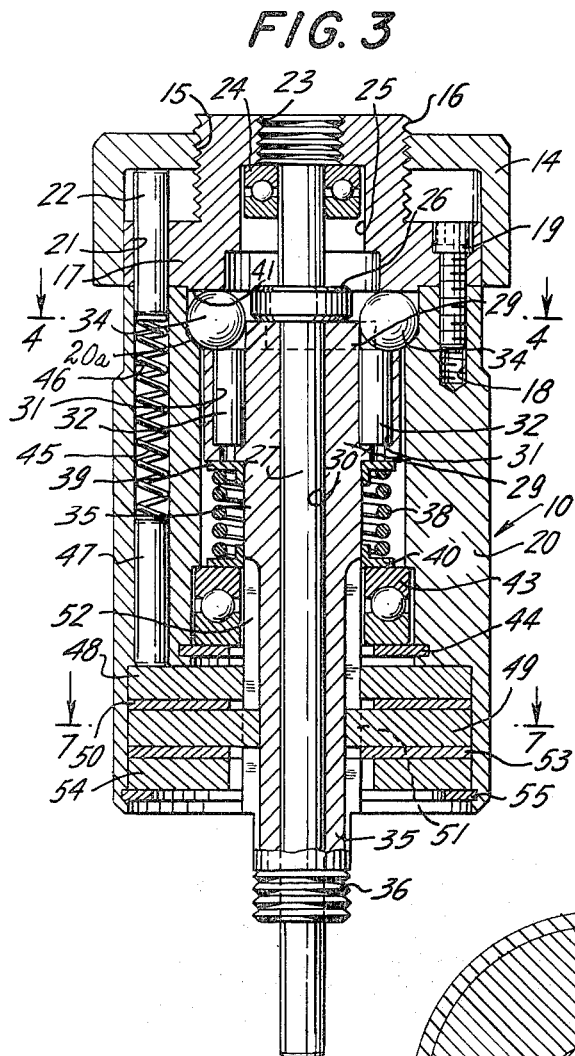
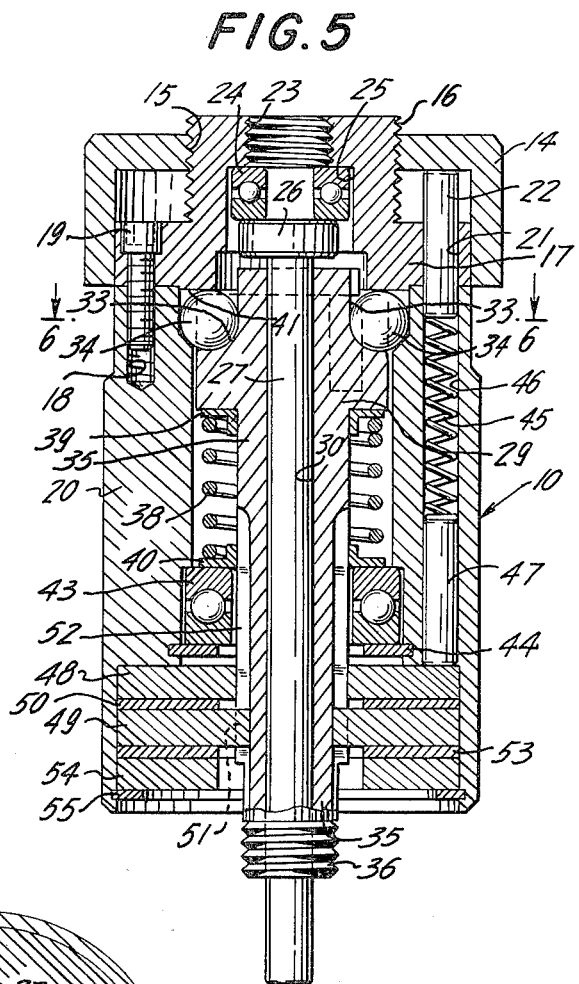
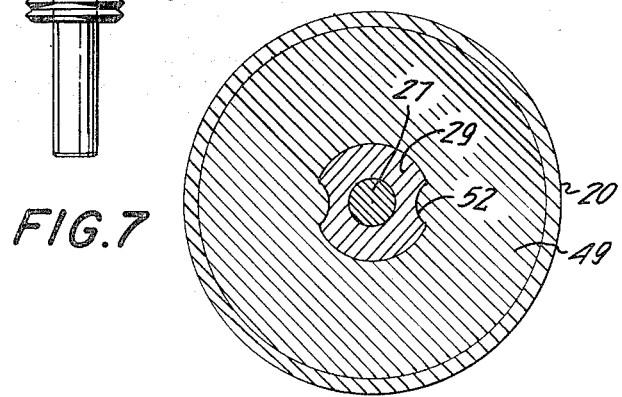

TORQUE TRIGGERING CLUTCH

The present invention is a continuation of my application Ser. No. 880,101, filed Feb. 22, 1978 now abandoned, which is a continuation in part of my application, Ser. No. 732,511 filed Oct. 14, 1976 entitled Torque Triggering Clutch, now abandoned.

BACKGROUND OF THE INVENTION

The invention relates in general to high speed capping machinery wherein a tightening chuck is used to tighten tops or caps on filled containers or bottles to a particular pre-set desired torque and then releasing the jaws of the chuck to allow the filled container to move to another position and allowing another container to be topped or capped.

More particularly, the invention relates to a torque triggering clutch which cooperates with the high speed capping machine and with a cap chuck to release the jaws of the chuck when the chuck has tightened a cap or top on to a container to a desired pre-set torque.

The torque triggering clutch of the instant invention comprises essentially a threaded and rotatable cap for applying greater or lesser pressure on a friction clutch assembly through an intermediate pin and coil spring assembly; a plunger and trigger head assembly which moves up or down against the pressure of a second coil spring and associated with the tightening chuck for opening same when the pre-set torque has been attained; and, a plurality of steel balls, magnets and ball receiving slots which collectively function to alternately restrain and then allow the trigger head to move upwardly thereby releasing the tightening chuck or gripping fixture. The rotatable cap threadably engages a threaded hub which is operatively associated with an outer cylinder which houses the entire assembly described above.

An external rod, which cooperates with the high speed capping machinery, for instance in a cam track thereof, extends through a rotating spindle which also cooperates with the high speed capping machine. The rotating spindle in turn cooperates with the torque triggering clutch which forms this invention whereby a downward force on the external rod causes the plunger, trigger head and coil springs to be forced downwardly which allows the steel balls to move out of their slots and be attracted by the magnets where they are held in place. When the downward force is removed the trigger head is forced against the steel balls by action of the second coil spring and the steel balls are pressed against the threaded hub. With the assembly in this position, and when a resisting force is applied to stop the rotating motion of the trigger head, the steel balls will begin to rotate and finally become aligned with their respective slots thereby allowing the trigger head to move upward by means of a coil spring thereby opening the jaws of the tightening clutch which is operatively associated with the lower end of the plunger.

SUMMARY OF THE INVENTION

Briefly, the invention relates to a device to be used in conjunction with a high speed capping machine and with a tightening chuck for securing tops or caps to filled containers wherein the device is disposed between the two and which functions to release jaws of the tightening chuck when a predetermined torque has been applied to the top or cap. The device comprises essentially an outer cylinder or housing; a threaded hub mounted on top of the housing; a pressure cap threadably connected to the hub; a thrust bearing disposed in the hub, an assembly comprising a plunger, trigger head, coil spring and thrust bearing; a plurality of pins and coil springs for varying the torque desired, cooperating with the pressure cap; a friction clutch disposed in the outer cylinder at the lower end thereof for applying a resistive force; and, a plurality of ball receiving slots formed in the trigger head, balls associated with the slots, and magnets disposed in the trigger head for attracting the balls and holding them in place out of their slots thereby arresting upward movement of the trigger head.

Accordingly, it is an object of the invention to provide a torque triggering clutch.

Another object of the invention is to provide a torque triggering clutch used to operate jaws of a tightening chuck or gripping fixture used in conjunction with high speed capping machinery.

Another object of the invention is to provide a torque triggering clutch wherein the degree of torque can be varied.

Another object of the invention is to provide a torque triggering clutch wherein when a pre-determined, pre-set torque has been reached, jaws of a chuck are caused to automatically open.

These and other objects and advantages of the invention are believed made clear by the following description thereby taken in conjunction with the accompanying drawings wherein;

IN THE DRAWINGS

FIG. 3 is a vertical section of the assembled device without the chuck.

FIG. 4 is a view taken on line 4—4 of FIG. 3.

FIG. 5 is a view similar to FIG. 3 but rotated 180°.

FIG. 6 is a view taken on line 6—6 of FIG. 5.

FIG. 7 is a view taken on line 7—7 of FIG. 3.

Figure 1:
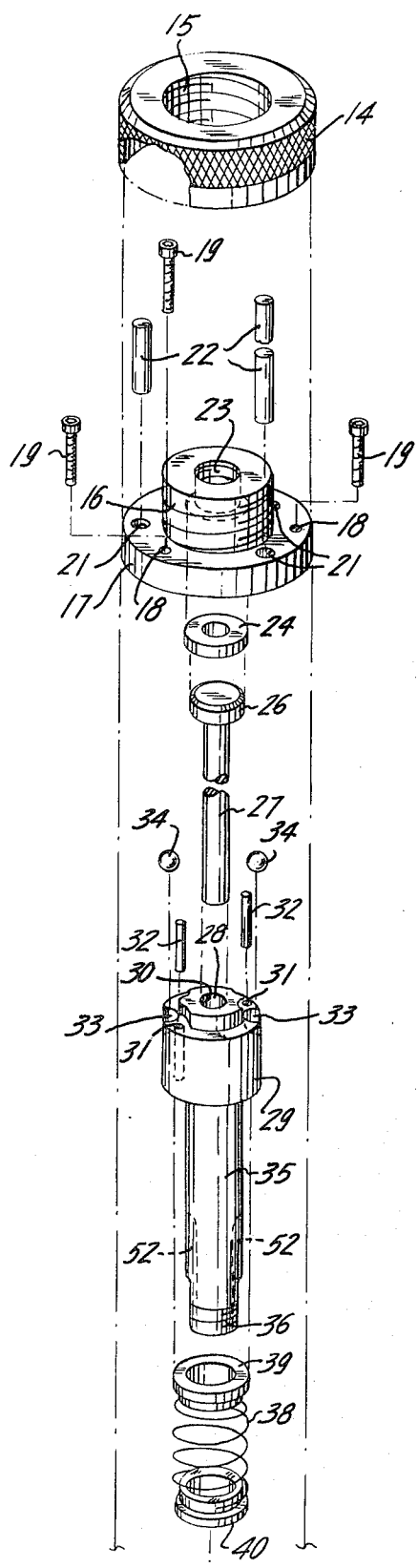
FIG. 1 is an exploded view of the cooperating parts of the torque triggering clutch.
Figure 1:
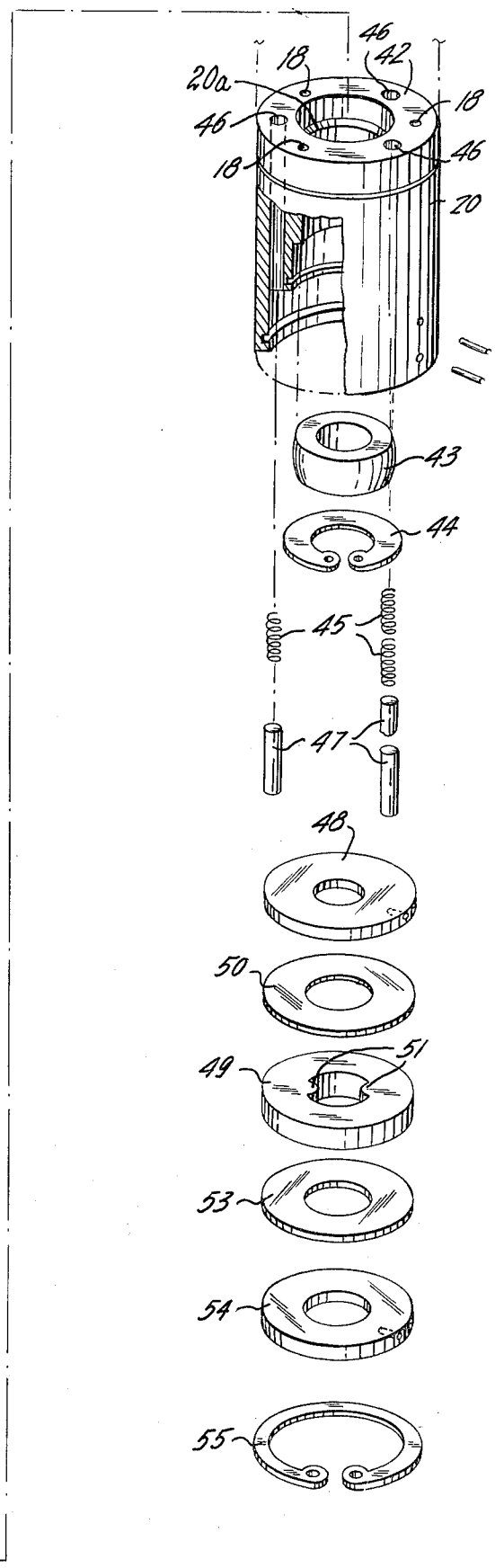

Referring now to the drawings there is shown the torque triggering clutch 10 which forms the instant invention cooperating with a tightening chuck 11 and a rotating spindle 12 which is operatively associated with a high speed capping machine not shown. Further, an external rod 13 is shown in phantom and which also is operatively associated with the high speed capping machine, such as in a cam track thereof.

Referring more particularly to FIG. 1 all the component parts of the torque triggering clutch which forms this invention will first be described, then their function, operation, and cooperation will be described in connection with FIGS. 2–7.

FIG. 1 is an exploded view showing all the component parts in an un-assembled but relative position.

A pressure cap 14, having internal threads 15, threadably engages the external threads 16 of a hub 17 which has a plurality of openings 18 formed therein for receiving set screws 19 for fastening the hub 17 to outer cylinder 20. A second plurality of openings 21 are formed in the hub for receiving a plurality of pins 22 for purposes to be more fully described below. Hub 17 also has internal threads 23 formed therein for receiving external rod 13 for purposes also to be more fully described. Cylinder 20 has a radial shoulder 20a located on its inner circumference towards its upper end, as shown.

A thrust bearing 24 is disposed in a circular opening 25 formed inside hub 17 for supporting external rod 13 and bears against plunger 26 when the external rod rotates into the hub 17 thereby creating a downward force on the plunger.

Plunger rod 27 extends into and through an axial opening 28 formed through the entire length of a trigger head 29 and slidably engages the internal wall 30 thereof. Also formed in trigger head 29 are a plurality of magnet receiving slots 31 for receiving a plurality of magnets 32 and a plurality of pockets or slots 33 for receiving steel balls 34. The steel balls alternately sit in the pockets and out of the pockets and on top of the magnets when the trigger head is in its extended or depressed position as again will be more fully explained below.

Figure 2:
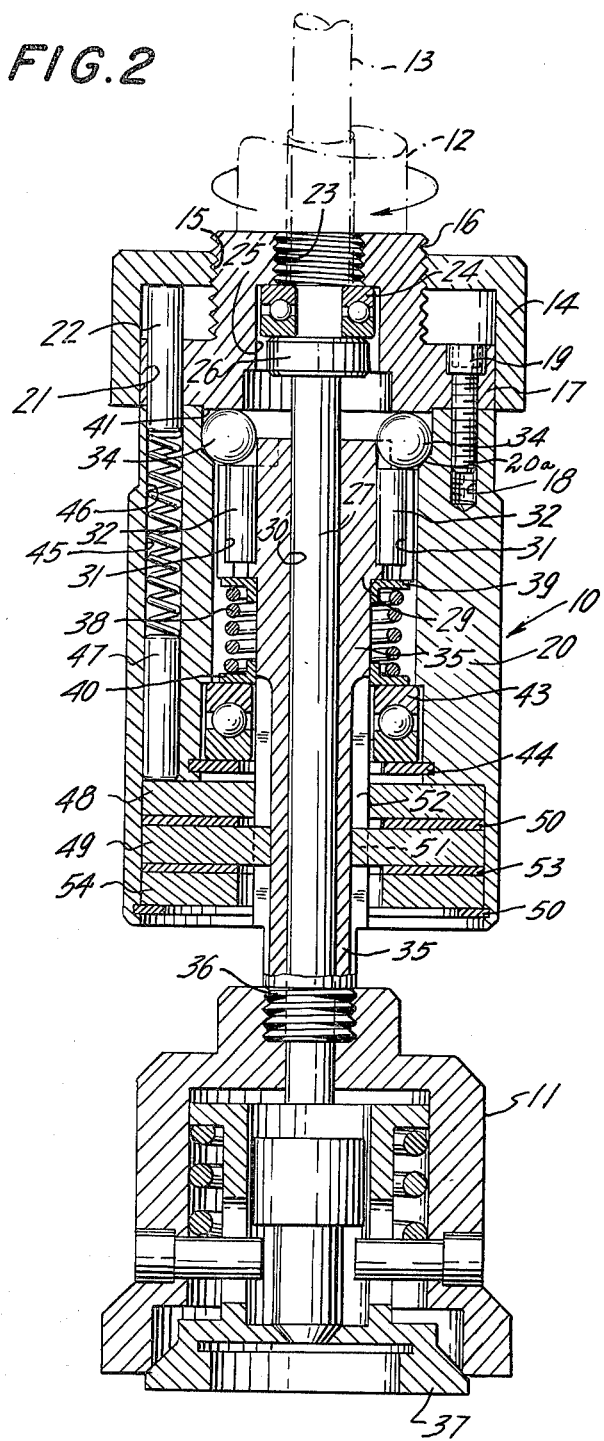
FIG. 2 is a vertical section of the assembled torque triggering clutch and tightening chuck.

Connected to the trigger head and depending downwardly therefrom is a trigger head shaft 35 having external threads 36 formed on the lower end thereof for receiving the tightening chuck 11 as shown in FIG. 2. The upward or downward movement of the trigger head alternately opens and closes the jaws 37 of the chuck. A coil spring 38 is disposed about shaft 35 and is held in place by spring retainer means 39 and 40. It is this spring 38 which urges the trigger head 29 upwardly to bear against the steel balls 34 when the balls are out of pockets 33 and on top of magnets 32. The steel balls in turn bear against a flange 41 formed internally of hub 17 to hold the trigger head in this extended position when the external downward force on the plunger is removed. With the entire assembly rotating in a clockwise direction by means of the rotating spindle 12, and when the preset counter torque is applied to the trigger head shaft 35 through the chuck 11, the balls will be caused of roll, by means of friction between the top of the trigger head and flange 41 in hub 17, until they aligned with and "drop into" pockets or slots 33 of the trigger head 29 thereby allowing the trigger head to be moved upward by means of coil spring 38 and thereby pulling chuck 11 against the lower end of plunger rod 27 releasing the jaws of the chuck.

Referring back to FIG. 1, threaded hub 17 cooperates with a flange surface 42 on top of cylinder 20 which has openings formed therein, compatible with openings 18 and 21 of hub 17, whereby the hub is secured to the cylinder by means of set screws 19 and whereby pins 22 can extend through the hub and into the openings formed in the cylinder. A second thrust bearing 43 is disposed in the cylinder and between a bearing retainer ring 44 and spring retainer 40 as best seen in FIG. 2. This thrust bearing 43 supports coil spring 38 thereby providing a rolling, anti-friction support for trigger head 17.

A plurality of small springs 45 are disposed in the pin receiving openings 46, below pins 22, and above pins 47, which also are inserted into openings 46. As previously pointed out, the torque can be varied and pre set depending upon the capping or topping function to be performed. This is accomplished by rotating pressure cap 14 on the threaded hub 17. The top of the cap will then bear against pins 22 which in turn will compress springs 45 which in turn will bear against pins 47. Pins 47 in turn will bear against clutch pressure plate 48 and clutch plate 49 through an intermediate friction disc 50 causing a sandwich effect whereby friction disc 50 is caused to drive clutch plate 49. Clutch plate 49 is drivably and rotatably connected to trigger head 29 by means of bosses 51 which cooperate with slots 52 formed in trigger head shaft 35. The trigger head is thereby caused to rotate, when spindle 12 is rotating, until the pre-set counter torque is reached which then overcomes the driving force of friction disc 50. It is at this point that the balls 34 will be caused by roll, by means of friction between the top of the trigger head and flange 41 in hub 17, until they aligned with pockets or slots 33 of the trigger head 29 thereby allowing the trigger head to be moved upward by means of coil spring 38 as the balls "drop into" the pockets, and thereby pulling chuck 11 against the lower end of plunger rod 27 releasing the jaws of the chuck all as previously explained. This pre-set counter torque is transmitted to clutch plate 49 by means of friction disc 53 and clutch pressure plate 54 and the entire clutch assembly is held in place and supported by a retainer ring 55.

OPERATION

The operation of the device will best be understood in regards to FIGS. 2-6.

The torque triggering clutch, which forms the instant invention, is disposed between a rotating spindle of a high speed capping machine and a chuck which functions to tighten a cap or lid onto a container. It is desired to disengage the jaws of the chuck from the tightened cap when a desired pre-set torque has been reached thus allowing the capped container to move to a new position and allowing the chuck to tighten a cap onto the next container.

First, the desired pre-set torque is set by rotating the pressure cap onto the threaded hub. The cap in turn will bear against the upper pins which in turn will compress the small springs thereby exerting pressure on the lower pins. These lower pins will bear against a clutch pressure plate and clutch plate through an intermediate friction disc thereby causing a sandwich effect whereby the friction disc is caused to drive the clutch plate. Since the clutch plate is connected to the trigger head as described, the head is caused to rotate when the spindle is rotating.

When a downward force is applied to the plunger by means of the external rod moving downward, the plunger is moved downward until it engages the top of the trigger head thereby compressing the coil spring to the position shown in FIG. 3. This will cause the steel balls to move out of their pockets and sit on top of the magnets by magnetic attraction as seen in FIG. 4. More precisely, the pockets 33 drop relative to the balls 34, which are restrained against substantial vertical movement by shoulder 20a in cylinder 20 and flange 41, as is evident from FIGS. 3 and 5. Balls 34 are thereby restrained from following trigger head 29 downwardly by shoulder 20a so the balls remain fixed axially relative to cylinder 20 but move up relative to trigger head 29 to a position out of their pockets where they are attracted towards the magnets.

When the downward force is now removed, the coil spring will urge the trigger head upwardly as seen in FIG. 5. The trigger head will bear against the steel balls which in turn will bear against the flange formed internally of the hub where they are held in the fixed position as seen in FIG. 5.

With the entire assembly rotating by means of the rotating spindle, and with the downward force removed, and with the steel balls out of their pockets and on top of the magnets, and with the chuck functioning to tighten a cap to the pre-set torque, the torque triggering clutch of the instant invention is set to trigger; that is, the trigger head is in a position to move upwardly under urging of the coil spring, when the pre-set desired torque has been reached.

When this pre-set torque has been reached, the clutch will slip and the trigger head will stop rotating. With the hub still rotating the steel balls will be caused to rotate by friction until they drop back into their pockets or slots. The trigger head will now be free to move upwardly by the urging of the coil spring thereby pulling the tightening clutch upwardly until it bears against the lower end of the plunger rod thereby releasing the jaws of the chuck.

The plunger is now set to receive another downward force which will again allow the balls to pop out of the slots, and the device is set to re-cycle.

Thus a torque triggering clutch has been disclosed which provides for opening a tightening clutch of a high speed capping machine when a desired pre-set torque has been reached.

It will be understood that the invention is not to be limited to the specific construction or arrangement of the parts shown and that they may be modified widely within the invention defined by the claims.

What is claimed is:

1. A torque triggering clutch for releasing a tightening cluck having jaws comprising:
    a. a trigger head which can rotate and move axially up or down when not rotating, operatively associated at its lower end with a tightening chuck having jaws for releasing said tightening chuck jaws when said trigger head moves axially up wherein said trigger head is connected to a rotating spindle having an external rod extending there through and also coacting with said trigger head whereby said trigger head is caused to rotate when said rotating spindle rotates and whereby said trigger head can move axially up or down when an upward or downward force is applied to said external rod;
    b. a plunger having a plunger rod depending therefrom and extending through said trigger head and operatively associated at its lower end with said tightening chuck having jaws for releasing said tightening chuck jaws when said trigger head, plunger and plunger rod are moved axially up;
    c. means for moving said plunger and said trigger head downwardly;
    d. means for holding said plunger and said trigger head in the downwardly compressed position until said trigger head stops rotating when said rotating spindle stops rotating;
    e. means for urging said trigger head upwardly when it stops rotating thereby pulling said tightening chuck having jaws upwardly until it bears against said plunger rod thereby releasing said tightening chuck jaws;
    f. means for rotating said trigger head and said plunger rod; and,
    g. means for stopping the rotation of said trigger head thereby allowing said trigger head to move upwardly thereby releasing said tightening chuck jaws.

2. The torque triggering clutch of claim 1 wherein said means for moving said plunger and said trigger head downwardly is a rod which extends coaxially of said plunger rod and said trigger head and whose lower end bears against a thrust bearing disposed on top of said plunger whereby when said rod is moved downwardly said thrust bearing, said plunger and said trigger head are caused to move downwardly.

3. The torque triggering clutch of claim 1 wherein said means for holding said plunger and said trigger head in the downwardly, compressed position until said trigger head stops rotating is a plurality of steel balls cooperating with the top of said trigger head and with a hub cooperating with the top of said trigger head thereby confining said steel balls between the top of said trigger head and said hub and thereby preventing upward movement of said trigger head.

4. The torque triggering clutch of claim 1 wherein said means for urging said trigger head upwardly when it stops rotating is a coil spring disposed about a shaft which extends downwardly of said trigger head, coaxially thereof and having a smaller diameter than said trigger head.

5. The torque triggering clutch of claim 4 wherein a thrust bearing is disposed about said shaft for providing a rolling, anti-friction support for said trigger head and wherein one end of said coil spring bears against said thrust bearing and the other end of said coil spring bears against said trigger head.

6. The torque triggering clutch of claim 3 wherein said means for rotating said trigger head and said plunger rod is a rotating spindle operatively associated with said hub.

7. The torque triggering clutch of claim 1 wherein said means for stopping the rotation of said trigger is a slip clutch operatively associated with a shaft which extends downwardly of said trigger head, coaxially thereof and having a smaller diameter than said trigger head, wherein when a pre-set counter torque has been reached said clutch is caused to slip thereby stopping the rotation of said trigger head and allowing said trigger head to move upwardly thereby pulling said gripping fixture upwardly until it bears against said plunger rod thereby releasing said gripping fixture.

8. The torque triggering clutch of claim 7 wherein said slip clutch comprises:
    a. a clutch pressure plate;
    b. a clutch plate drivably and rotatably connected to said trigger head by means of bosses which cooperate with slots formed in said shaft; and
    c. an intermediate friction disc disposed between said clutch pressure plate and said clutch plate whereby said friction disc is caused to drive said clutch plate, said shaft and said trigger head until a pre-set counter torque has been reached thereby causing said clutch to slip and stopping the rotation of said shaft.

9. The torque triggering clutch of claim 7 wherein said pre-set counter torque can be varied.

10. The torque triggering clutch of claim 9 wherein said pre-set counter torque varying means comprises:
    a. a pressure cap having screw threads formed internally thereof;
    b. a threaded hub having screw threads formed externally thereof for receiving said pressure cap;
    c. a plurality of pins disposed in openings formed through said threaded hub; one end of the said pins bearing against a plurality of small springs;
    d. a second plurality of pins disposed below small springs whereby said small springs will bear against one end of said second plurality of pins;

e. a clutch pressure plate disposed below said second plurality of pins whereby said second plurality of pins will bear against said clutch pressure plate;
f. a friction disc disposed below said clutch pressure plates; and
g. a clutch plate disposed below said friction disc whereby when said pressure cap is rotated onto said threaded hub, said plurality of pins, said small springs, said second plurality of pins, said clutch pressure plate, said friction disc, and said clutch plate will be caused to be compressed thereby varying said counter torque.

11. The torque triggering clutch of claim 3 wherein said trigger head further comprises a plurality of magnets disposed therein at the top thereof and a plurality of slots formed therein for receiving said steel balls when they are not cooperating with said magnets thereby alternately allowing said trigger head to move upwardly and preventing upward movement of said trigger head.

12. The torque triggering clutch of claim 11 further comprising an outer cylinder having a flange surface to which said hub is fastened for holding said hub.

13. The torque triggering clutch of claim 8 wherein said slip clutch is housed in an outer cylinder having a retainer ring operatively associated with the lower end thereof for supporting and retaining said slip clutch in said outer cylinder.

14. The torque triggering clutch of claim 1 wherein said trigger head is axially slidably received in an outer cylinder.

15. The torque triggering clutch of claim 14 wherein said plunger rod is axially slidably received in said trigger head.

16. A torque triggering clutch for releasing a tightening chuck having jaws comprising:
a. a trigger head which can rotate and move axially up or down when not rotating, operatively associated at its lower end with a tightening chuck having jaws for releasing said tightening chuck jaws when said trigger head, plunger and plunger rod are moved axially up wherein said trigger head is connected to a rotating spindle having an external rod extending there through and also coacting with said trigger head whereby said trigger head is caused to rotate when said rotating spindle rotates and whereby said trigger head can move axially up or down when an upward or downward force is applied to said external rod;
b. a plunger having a plunger rod depending therefrom, and extending through said trigger head and operatively associated at its lower end with said tightening chuck having jaws for releasing said tightening chuck jaws when said trigger head, plunger and plunger rod are moved axially up;
c. a rod extending coaxially of said plunger rod and said trigger head whose lower end bears against a thrust bearing disposed on top of said plunger whereby when said rod is moved downwardly said thrust bearing, said plunger and said trigger head are caused to move downwardly;
d. a plurality of steel balls cooperating with the top of said trigger head with a hub cooperating with the top of said trigger head thereby confining said steel balls between the top of said trigger head and said hub and thereby preventing upward movement of said trigger head until said trigger head stops rotating when said rotating spindle stops rotating;
e. a coil spring disposed about a shaft which extends downwardly of said trigger head, coaxially thereof, and having a smaller diameter than said trigger head, for urging said trigger head upwardly when it stops rotating when said rotating spindle stops rotating thereby pulling said tightening chuck having jaws upwardly until it bears against said shaft;
f. a rotating spindle operatively associated with said hub for rotating said trigger head and said plunger rod; and,
g. a slip clutch operatively associated with a shaft which extends downwardly of said trigger head, coaxially thereof and having a smaller diameter than said trigger head, wherein when a pre-set counter torque has been reached, said clutch is caused to slip thereby stopping the rotation of said trigger head and allowing said trigger head to move upwardly thereby pulling said tightening chuck having jaws upwardly until it bears against said plunger rod thereby releasing said jaws of said tightening chuck.

* * * * *